United States Patent
Anderson

Patent Number: 5,581,935
Date of Patent: Dec. 10, 1996

[54] TREE PROTECTOR

[76] Inventor: Sandra S. Anderson, R.R. 2, Box 36, Blue Mound, Ill. 62513

[21] Appl. No.: 603,063

[22] Filed: Feb. 20, 1996

[51] Int. Cl.$^6$ .................................................. A01G 13/02
[52] U.S. Cl. .................... 47/23; 47/25; 49/58; 52/101
[58] Field of Search ................................... 47/23, 24, 25, 47/58; 49/58; 52/101

[56] References Cited

U.S. PATENT DOCUMENTS

| | | | |
|---|---|---|---|
| 141,716 | 8/1873 | Hume | 47/23 |
| 464,879 | 12/1891 | Knapp | 47/23 |
| 2,263,874 | 11/1941 | Hilleman | 47/25 |
| 4,431,166 | 2/1984 | Marshall | 47/25 |
| 5,060,416 | 10/1991 | Rohde | 47/23 |
| 5,528,858 | 6/1996 | Omdahl | 47/25 |

FOREIGN PATENT DOCUMENTS

| | | | |
|---|---|---|---|
| 2924995 | 1/1981 | Germany | 47/23 |

*Primary Examiner*—Henry E. Raduazo
*Attorney, Agent, or Firm*—Philip L. Bateman

[57] ABSTRACT

A tree protector for a young tree growing in a pasture prevents damage by grazing animals such as cattle. The tree protector contains two major components. The first component is a freely rotatable, perforated cylinder that surrounds the trunk of the tree and prevents cattle from scratching their heads on the trunk. The second component is a ring that rests on the ground and surrounds the tree. The ring contains cavities larger than the feet of cattle and prevents cattle from stepping on the ring and getting close enough to eat the leaves or rub their bodies against the trunk.

17 Claims, 2 Drawing Sheets

FIG. 2
FIG. 3
FIG. 4
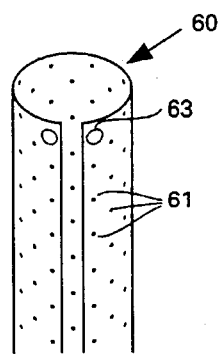
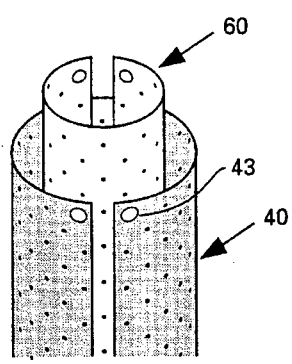
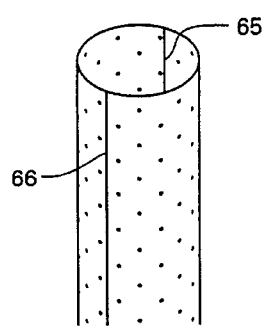
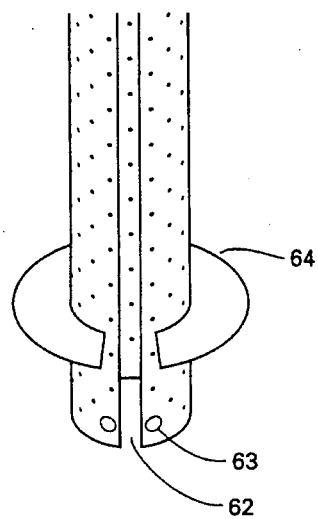
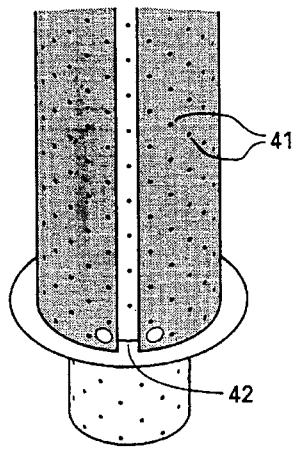
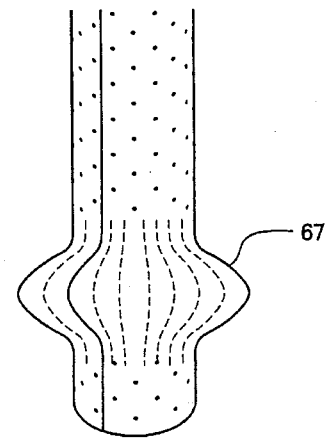

5,581,935

TREE PROTECTOR

FIELD OF THE INVENTION

This invention relates to plant husbandry. More particularly, this invention relates to tree protectors or guards for preventing damage to young trees by grazing animals such as cattle.

BACKGROUND OF THE INVENTION

Cattle spend much of their lives grazing in pastures. Trees in pastures provide shade to the cattle and are also aesthetically pleasing. Unfortunately, it is very difficult to plant and grow new trees in pastures where cattle are grazing. Cattle inevitably kill unprotected new trees in one or more of three ways. First, cattle eat the leaves off the lower branches. Second, cattle scratch their heads and horns against the trunk of the tree and tear off the bark. Third, cattle rub their bodies against the trunk and disrupt the root system. They can even uproot and topple the tree. Some cattle ranchers build fences or other barriers around young trees in pastures, but such fences are expensive and time-consuming to erect and to maintain. Similar damage to young trees is inflicted by other large grazing animals, both wild and domestic, including horses, sheep, goats, deer, and buffalo.

A number of reusable tree protectors and guards have been disclosed. For example, Smith, U.S. Pat. No. 2,782,561, issued Feb. 26, 1957, discloses a decorative ring surrounding a tree and resting on the ground. The Smith ring contains a channel so that a flower bed can be planted in the ring. The Smith ring would be ineffective in a cattle pasture because cattle could and would easily step on and over the ring to reach the tree.

Scharf, U.S. Pat. No. 4,268,992, issued May 26, 1981, discloses a tree protector having a cylindrical portion covering the lower 12 to 24 inches of the trunk and a base that is secured to the ground with hollow stakes. The hollow stakes form part of a system that provides water to the tree through the base. The base extends outwardly 14 to 18 inches from the trunk. The Scharf tree protector is designed for preventing damage by small animals such as rabbits and would offer no protection from cattle.

Graves, U.S. Pat. No. 4,922,652, issued May 8, 1990, discloses a tree protector having a flexible cylinder surrounding the trunk and a base that is secured to the ground with stakes. The Graves tree protector is designed to protect a young tree from strong winds and encroaching weeds. The cylinder does not rotate and the base would not prevent cattle from stepping on it and rubbing their heads and bodies against the cylindrical portion of the tree protector.

It can be seen that none of these tree protectors and guards would adequately protect a young tree from grazing animals and that a demand still exists for such a tree protector.

SUMMARY OF THE INVENTION

The general object of this invention is to provide an improved tree protector. A more particular object is to provide a tree protector that protects a young tree from damage by grazing animals such as cattle.

I have invented an improved tree protector for protecting a young tree growing in a pasture from damage by grazing animals such as cattle. The tree protector comprises: (a) a freely rotatable, perforated cylinder having a diameter of about 4 to 25 cm (2 to 10 in) and adapted to substantially surround the trunk of the tree; and (b) a ring having an outside diameter of about 1 to 3 m (3 to 10 ft), a width of about ½ to 2 m (1½ to 6 ft), and a height of about 5 to 50 cm (2 to 20 in), the ring being adapted to rest on the ground surrounding the tree and having a plurality of cavities in its upper surface, the cavities being large enough for the feet of cattle to enter.

The tree protector of this invention protects a young tree from damage by grazing animals such as cattle in two primary ways. First, cattle do not scratch their heads and horns against the trunk because the cylinder around the trunk rotates freely and, therefore, offers no resistance for scratching. Secondly, cattle do not step on the cavity-containing ring because the cavities appear to cattle to be deep, dangerous holes. Because cattle are unwilling to step on the ring, they cannot get close enough to the tree to eat its leaves or rub their bodies against the trunk. In addition to its protective function, the tree protector of this invention has other desirable properties. It does not interfere with the growth of the tree and it is weatherproof, easy to install and remove, inexpensive, and reusable.

BRIEF DESCRIPTION OF THE DRAWINGS

FIG. 2 is a detailed perspective view of one component of the tree protector shown in FIG. 1.

FIG. 3 is a detailed perspective view of two components of the tree protector shown in FIG. 1.

FIG. 4 is a detailed perspective of a second embodiment of the component shown in FIG. 2.

DETAILED DESCRIPTION OF THE INVENTION

Figure 1:
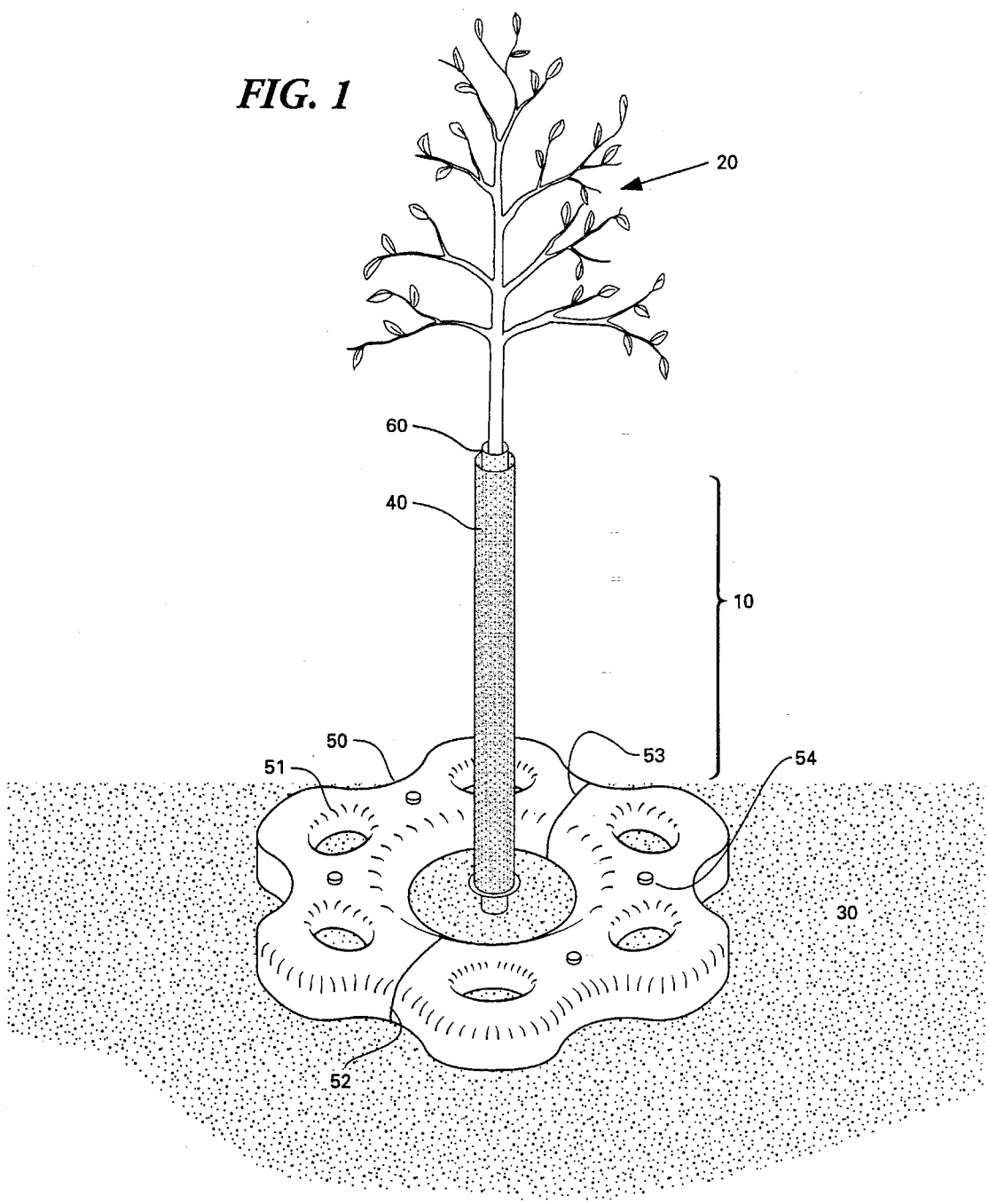
FIG. 1 is a perspective view of one embodiment of the tree protector of this invention.

This invention is best understood by reference to the drawings. FIG. 1 shows one embodiment of the tree protector 10 of this invention in place on a young tree 20 growing in the ground 30 of a cattle pasture. The tree protector has two major components, a rotatable cylinder or sleeve 40 and a ring 50. Each of these components is discussed in turn.

The primary purpose of the cylinder is to prevent cattle from scratching their heads and horns against the trunk of the tree. To accomplish this purpose, the cylinder surrounds the portion of the trunk reachable by cattle with their heads and is freely rotatable so that the cattle encounter little friction if they attempt to scratch their heads and horns against the cylinder. More specifically, the cylinder surrounds all or substantially all the circumference of the trunk of the tree. The cylinder also surrounds substantially all the lower portion of the trunk where the animal threatening the young tree can reach. In the case of cattle, a cylinder covering the lower 1.5 m (5 ft) of the trunk covers the area where the heads of cattle can reach. For protection against horses, a height of about 2 m (6 ft) is protected whereas a lower height of about 1.2 m (4 ft) is protected for sheep or goats.

The cylinder is freely rotatable, i.e., it can be rotated by hand without raising it. The free rotation ensures that cattle get no relief if they attempt to scratch themselves against the cylinder. The means by which free rotation is imparted to the cylinder is not critical to this invention. Various arrangements of wheels, rollers, bearings, tracks, and the like are suitable. A simple, inexpensive, and preferred means of providing free rotation is shown in FIGS. 1, 2, and 3. The rotatable cylinder surrounds an inner cylinder 60, which is also placed around the trunk of the tree. The primary purpose of the inner cylinder is to provide a smooth surface against which the outer cylinder rotates. Free rotation of the inner cylinder is not necessary so it may rest on the ground.

The inner cylinder has a diameter about 2 to 10 cm (1 to 4 in) greater than the diameter of the tree trunk so that the tree has room to grow. Trees having a trunk diameter of about 2 to 15 cm (1 to 6 in) are the size generally needing protection. Trees smaller than this are rarely planted in pastures while larger trees are strong enough to withstand the contact with animals. Accordingly, the inner cylinder generally has a diameter of about 4 to 25 cm (2 to 10 in).

The inner cylinder contains perforations 61 to allow sunlight to enter and to allow moisture to escape. If no sunlight entered, the trunks of some trees would develop unsightly sprouts. If moisture could not escape, the tree would be susceptible to mold and other diseases. Perforations having a diameter of about 1 to 5 mm (0.04 to 0.20 in), preferably about 3 mm (0.12 or ⅛ in), with a spacing between perforations of about 8 cm (3 in) provide adequate sunlight and ventilation. If the perforations are too large, the cattle may insert their horns through the perforations and cause damage. Considerably more or fewer perforations are also suitable, with the preferred amount being dependent upon the type of tree, the age of the tree, the climate, and other factors.

The inner cylinder contains a lengthwise slit 62 that enables it to be slipped over the tree trunk. If a more secure positioning on the tree is desired, strong and weatherproof connectors (not shown) are easily threaded through holes 63 at the top and bottom of the cylinder adjacent the slit and connected together. Suitable connectors are plastic chain locks, heavy gauge wire, and the like.

An annular collar 64 extends outwardly from the inner cylinder at a height of about 5 to 13 cm (2 to 5 in) off the ground. The purpose of the collar is to support the outer cylinder. The collar is preferably horizontal or downwardly sloping (from the inside to the outside) so that dirt and debris do not accumulate and are washed away by rain. The upper surface of the collar is smooth so the outer cylinder can rotate freely on the collar. An alternate inner cylinder is shown in FIG. 4. This cylinder is made of two vertical sections that are joined together along seams 65 and 66. In place of the annular collar, this cylinder contains a protruding portion 67 upon which the outer cylinder rests. The protrusion is less likely to be broken than a collar.

The inner cylinder is made of a weatherproof material having sufficient strength and rigidity to maintain its shape and resist breakage. Preferred materials are synthetic polymeric elastomers, commonly known as plastics. Examples of suitable plastics include polyvinylchloride (PVC), polyethylene, polypropylene, polybutylene, polyacrylates, and the like. A highly preferred material is a polyvinylchloride having a thickness of about 1 to 5 mm (0.04 to 0.20 in) because it is strong, lightweight, inexpensive, and sufficiently flexible that a cylinder with a lengthwise slit can be spread open and slid over the trunk of a tree. If desired, the inner cylinder is made of two or more vertical or horizontal sections that are secured together, as is the inner cylinder shown in FIG. 4.

The outer cylinder 40, as previously discussed, is freely rotatable. If there is an inner cylinder in place (as in the embodiment shown in the drawings), the outer cylinder generally has a diameter about 1 to 10 cm (½ to 4 in) greater than the diameter of the inner cylinder so the outer cylinder can freely rotate around the inner cylinder. If there is no inner cylinder, the rotatable cylinder generally has a diameter about 2 to 10 cm (1 to 4 in) greater than the diameter of the tree so the tree has room to grow. In general, the diameter of the rotatable cylinder is about 4 to 25 cm (2 to 10 in). The diameter of the rotatable cylinder is preferably about 10 to 15 cm (4 to 6 in). The height of the rotatable cylinder is preferably less than that of the inner cylinder (if there is one) so that the outer, rotatable cylinder does not rub against the uneven bark of the tree trunk. In other respects, the outer cylinder is similar to the inner cylinder. It contains the same type of perforations 41, has the same type of lengthwise slit 42 for mounting or is made of two or more sections joined together, has the same type of holes 43 for securing the slit together, and is made of the same types of material.

The second component of the tree protector is a cavity-containing ring that rests on the ground and surrounds the base of the tree. The primary purpose of the ring is to prevent the cattle from stepping near enough the tree to eat the leaves and/or to rub their bodies against the trunk. The ring accomplishes this goal because cattle have been found to be afraid to step into any type of hole. While not wishing to be bound by theory, the cavities in the ring apparently appear to be deep, dangerous holes to the cattle. In fact, the cavities are simply open to the ground level.

The ring has an outside diameter of at least about 1 m (3 ft), and preferably at least about 2 m (6 ft) so cattle cannot get near enough the tree to rub their bodies against it. As the outside diameter of the ring increases, the protection afforded increases as well. However, the bulk and expense of the ring also increase. For this reason, the outside diameter of the ring is generally less than about 3 m (10 ft). The width (the difference between the outside and inside diameters) of the ring is at least about ½ (1½ ft) so cattle are unable to step across it. As the width increases, the protection, bulk, and expense of the ring increase as well. The width of the ring is preferably at least about ⅔ m (2 ft) and most preferably about 1 to 2 m (3 to 6 ft). It is preferred that the inside diameter be at least about 15 cm (6 in) greater than the diameter of the rotatable cylinder. This leaves an open space on the ground at the base of the tree trunk so that water can enter the ground and nourish the roots of the tree. The height of the ring is generally about 5 to 50 cm (2 to 20 in). If the height is less than about 5 cm (2 in), the cavities appear less dangerous and cattle may step onto the ring. As the height increases, the protection increases, but, again, the bulk and expense increase as well.

The ring contains a plurality of cavities 51 in its upper surface. The cavities extend all or substantially all the way through the ring to the ground. The cavities preferably extend all the way to the ground so that water does not accumulate in the cavities. The cavities are large enough for the feet of the cattle to enter, i.e., they have a cross-sectional area of at least about 100 cm$^2$ (15 in$^2$) and preferably an area of at least about 400 cm$^2$ (60 in$^2$).

The ring is fully enclosed on its upper and side surfaces, and is generally also enclosed on its bottom surface. The ring is preferably hollow to reduce weight and cost. However, the ring is strong enough to withstand the weight of cattle taking tentative steps onto the ting. The ring is made of the same types of materials as the cylinders and the preferred material is polyvinylchloride. As shown in FIG. 1, the ring is made of two sections positioned together along seams 52 and 53. A plurality of ring sections is also suitable. The sections are secured to the ground with stakes 54 (only the heads of which are seen in FIG. 1) driven through interior channels (not shown) in the ring sections. The stakes are preferably driven flush with the top of the ring, as shown, so the cattle are unable to rub their heads against them. If desired, the ring sections are secured to each other with latches, ties, or the like (not shown). The ring preferably has rounded edges because cattle tend to scratch their heads against any sharp edges.

The tree protector of this invention is easily and quickly placed in position on a young tree just planted in a cattle pasture. It is highly preferred that a contact herbicide be applied in the area of the ring so that grasses and weeds do not cover up the ring. A preferred herbicide is ROUNDUP, a commercial product of the Monsanto Company, St. Louis, Mo., because it controls the growth of grasses and weeds, but does not harm the tree. The tree protector is typically left in position for several years as the tree grows. Once the tree has attained sufficient size (the branches are out of reach of the cattle and the tree is strong enough to withstand scratching by the cattle), the tree protector is removed. The tree protector is reusable and can then be placed on a different newly planted tree. The tree protector is aesthetically pleasing when in place. It can be made of colors that blend with the natural colors of the tree and pasture or it can be made a color such as white to complement white fences and buildings in the vicinity of the pasture.

The ring is an important component in protecting trees from cattle. However, the rotatable cylinder alone offers substantial protection against other animals such as deer that scratch their horns against the trunks of trees, but rarely uproot young trees.

I claim:

1. An apparatus for protecting a young tree growing in a pasture from damage by grazing animals such as cattle, the apparatus comprising:
   (a) a freely rotatable, perforated cylinder having a diameter of about 4 to 25 cm (2 to 10 in) and adapted to substantially surround the trunk of the tree; and
   (b) a ring having an outside diameter of about 1 to 3 m (3 to 10 ft), a width of about ½ to 2 m (1½ to 6 ft), and a height of about 5 to 50 cm (2 to 20 in), the ring being adapted to rest on the ground surrounding the tree and having a plurality of cavities in its upper surface, the cavities being large enough for the feet of cattle to enter.

2. The apparatus of claim 1 wherein the rotatable cylinder covers substantially the lower 1.5 m (5 ft) of the trunk.

3. The apparatus of claim 2 additionally comprising a non-rotatable perforated cylinder in between the trunk and the rotatable ring.

4. The apparatus of claim 3 wherein the cavities in the ring have a cross-sectional area of at least about 100 cm² (15 in²).

5. The apparatus of claim 3 wherein the outside diameter of the ring is about 2 to 3 m (6 to 10 ft).

6. The apparatus of claim 5 wherein the non-rotatable cylinder contains a protruding member upon which the rotatable cylinder rests.

7. The apparatus of claim 6 wherein the outside diameter of the rotatable cylinder is about 10 to 15 cm (4 to 6 in).

8. An apparatus for protecting a young tree growing in a pasture from damage by grazing animals such as cattle, the apparatus comprising a freely rotatable, perforated cylinder having a diameter of about 4 to 25 cm (2 to 10 in) adapted to substantially surround the lower 1.5 m (5 ft) of the trunk of the tree and a non-rotatable perforated cylinder in between the trunk and the rotatable ring.

9. The apparatus of claim 8 wherein the non-rotatable cylinder contains a protruding member upon which the rotatable cylinder rests.

10. The apparatus of claim 9 wherein the outside diameter of the rotatable/cylinder is about 10 to 15 cm (4 to 6 in).

11. A method for protecting a young tree growing in a pasture from damage by grazing animals such as cattle, the method comprising:
    (a) placing a freely rotatable, perforated cylinder having a diameter of about 4 to 25 cm (2 to 10 in) around the trunk of the tree; and
    (b) placing a ring having an outside diameter of about 1 to 3 m (3 to 10 ft), a width of about ½ to 2 m (1½ to 6 ft), a height of about 5 to 50 cm (2 to 20 in), and having a plurality of cavities in its upper surface, the cavities being large enough for the feet of cattle to enter, on the ground surrounding the tree.

12. The method of claim 11 wherein the rotatable cylinder covers substantially the lower 1.5 m (5 ft) of the trunk.

13. The method of claim 12 additionally comprising placing a non-rotatable perforated cylinder in between the trunk and the rotatable ring.

14. The method of claim 13 wherein the cavities in the ring have a cross-sectional area of at least about 100 cm² (15 in²).

15. The method of claim 14 wherein the outside diameter of the ring is about 2 to 3 m (6 to 10 ft).

16. The method of claim 15 wherein the non-rotatable cylinder contains a protruding member upon which the rotatable cylinder rests.

17. The method of claim 16 wherein the outside diameter of the rotatable cylinder is about 10 to 15 cm (4 to 6 in).

* * * * *